INVENTORS
RICHARD GORCEY
WILLIAM W. MOWER
ELMO E. AYLOR
BY
Lowell J. Turner
AGENT Oct. 25, 1966  R. GORCEY ET AL  3,280,850
HOLLOW STRUCTURAL ELEMENTS AND METHODS FOR FABRICATING SAME
Original Filed Feb. 29, 1960  4 Sheets-Sheet 2

INVENTORS
RICHARD GORCEY
WILLIAM W. MOWER
BY ELMO E. AYLOR

Lowell J. Turner
AGENT

INVENTORS
RICHARD GORCEY
WILLIAM W. MOWER
ELMO E. AYLOR
BY Lowell G. Turner
AGENT Oct. 25, 1966   R. GORCEY ET AL   3,280,850
HOLLOW STRUCTURAL ELEMENTS AND METHODS FOR FABRICATING SAME
Original Filed Feb. 29, 1960   4 Sheets-Sheet 4

INVENTORS
RICHARD GORCEY
WILLIAM W. MOWER
ELMO E. AYLOR
BY

AGENT

United States Patent Office 3,280,850
Patented Oct. 25, 1966

3,280,850
HOLLOW STRUCTURAL ELEMENTS AND METHODS FOR FABRICATING SAME
Richard Gorcey, Encino, William W. Mower, Calabasas, and Elmo E. Aylor, Woodland Hills, Calif., assignors to North American Aviation, Inc.
Continuation of abandoned application Ser. No. 11,635, Feb. 29, 1960. This application May 6, 1963, Ser. No. 282,191
2 Claims. (Cl. 138—153)

This is a continuation of application Serial No. 11,635 filed February 29, 1960, and now abandoned.

This invention is generally directed to hollow structural elements and to methods for fabricating same. It is more specifically directed to a new rocket engine thrust chamber and the the method by which it is produced, wherein a high strength reinforcing material forms at least a portion of the chamber walls.

In the field of rocketry, thrust chambers must be designed and built to withstand extremely high temperatures and pressures. In order that the temperature requirements might be met, it has been a practice throughout the liquid propellant rocket industry to manufacture thrust chambers having a series of elongated thin-walled tubes adjacently placed in a circular pattern to form the thrust chamber walls. A coolant, usually liquid fuel, is circulated through the tubes, picking up heat from the tube walls. The coolant is subsequently injected into the combustion chamber. Thrust chambers cooled in this manner are actually heat exchangers, and are said to be regeneratively cooled.

In the construction of tubular walled thrust chambers, the tubes have usually been brazed together and a series of separate metal hoops or bands have been welded about the outer thrust chamber peripheries to provide hoop strength for opposing the chamber internal pressure during engine operation. Thrust chambers manufactured in this manner have had several detrimental characteristics including high weight (a critical feature in the field of rocketry), exposed exterior tube walls susceptible of handling damage, high fabrication expense and a low reproducibility factor. Additionally, each thrust chamber has required a series of metal bands of different sizes and shapes. This feature alone has limited high production rates and added to the cost.

Through the utilization of the present process, a lightweight chamber, with high hoop strength is readily producible. The later phases of the process steps required to produce such chambers are infinitely variable to provide a wall thickness of any desired dimension and strength. Chambers may also be manufactured with a high degree of reproducibility, a shorter fabrication time and lower total weight than may conventional chambers. The exterior surfaces of the regenerative cooling tubes in the preferred thrust chamber configuration of this invention are completely covered with a hard coat of fiber-containing plastic and are thereby fully protected from external structural damage. Additionally, the present fabrication process is applicable to the construction of all chamber sizes within the practical limits of tubing, a minimum of work being required in the changeover from one size to another.

The present process is also applicable to the production of solid propellant rocket thrust chambers. In such cases, the present practice of casting the solid propellant grain directly in a prefabricated casing, and problems inherent in this practice, are obviated by precasting the grain under ideal conditions and then fabricating the casing directly upon the grain and, where desirable, fabricating nozzles and skirt attachments over mandrels.

A principal object of this invention is to provide an improved method for fabricating rocket engine thrust chambers.

Another object is to provide a method for fabricating a regeneratively cooled thrust chamber having a continuous shell of fiber-containing plastic covering the external periphery of the cooling tubes.

A further object of this invention is to provide a method wherein a thrust chamber of high hoop strength and light weight is readily producible.

A still further object is to provide a rocket engine thrust chamber fabrication method susceptible of high production rates and accurate reproducibility.

Another object is to produce a regeneratively cooled tubular thrust chamber having the exterior of the tubes fully protected against handling damage.

Yet another object is to provide a method for introducing a pre-stress into a solid propellant rocket grain by fabricating a glass reinforced plastic casing directly upon the solid propellant grain.

Other objects will become apparent from the following description taken in connection with the accompanying drawings, in which.

Figure 1:
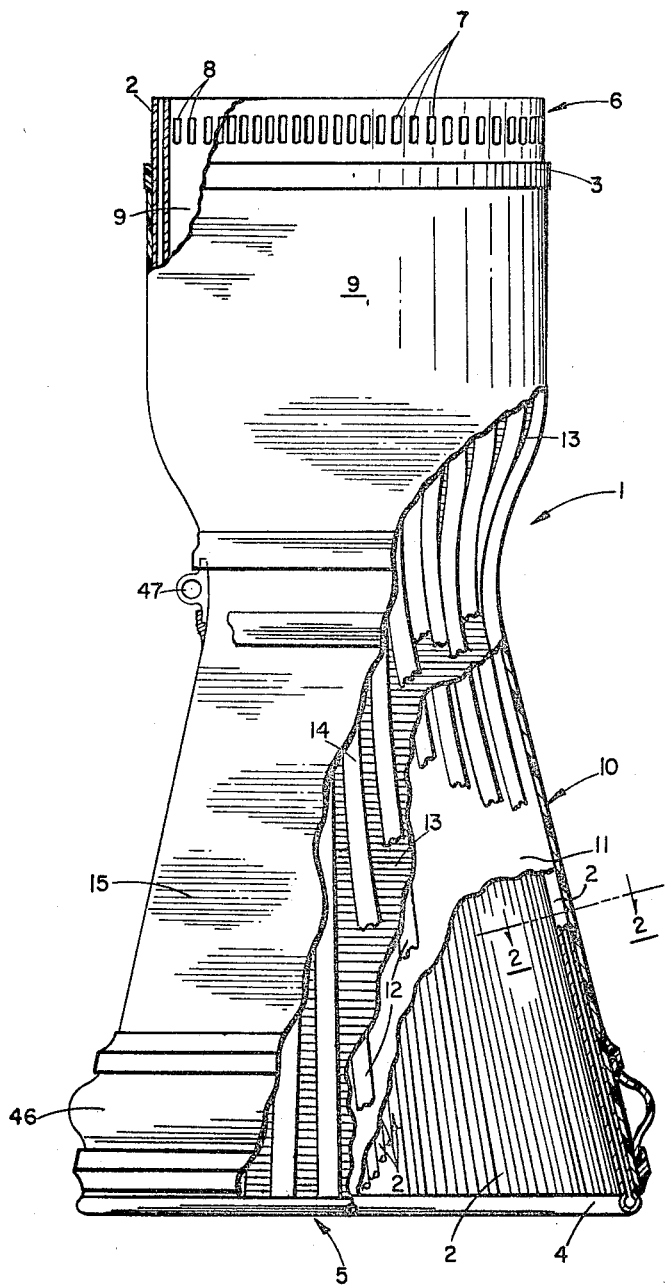
FIG. 1 is a cut-away drawing of a thrust chamber manufactured in accordance with the present invention.

The specific overall shape of the regeneratively cooled rocket engine illustrated in FIG. 1 is representative only, the ultimate shapes of chambers produced by the method of the present invention being infinitely variable.

In the practice of this invention and the preferred structural embodiment, thrust chamber 1 of FIG. 1 is constructed of a series of tubes 2, each tube varying in cross section between its ends to facilitate chamber construction in the desired shape. Tubes are usually assembled circumferentially about the periphery of a central mandrel of the desired thrust chamber shape, each tube having been formed to its desired cross sectional configuration prior to assembly. While so assembled on the mandrel, the tubes may be secured in position by brazing or otherwise attaching one or more thin metal bands circumferentially about the tubes, e.g. ring 3. A manifold 4 may be similarly attached to rearward ends 5 of the thrust chamber. The forward end of the chamber is indicated as 6. A series of cutouts 7, for example, through the outer walls of alternate tubes 2, and a similar series of cutouts 8 through the inner walls of opposite alternate tubes 2, may be provided adjacent end 6 to facilitate the passage of liquid coolant into and out of tubes 2. In such case, coolant is circulated by directing the fluid into cutouts 7 from a manifold (not shown) attached about the tubes and enclosing the cutouts in a conventional manner. The coolant then progresses rearwardly through tubes 2, empties into manifold 4, and is redirected forwardly through alternate tubes 2 to exit at cutouts 8. It is then introduced into an injector (not shown) of any desired configuration and injected into combustion chamber 9. Variations in this basic design, such as selecting specific tubes for fluid inlet and outlet, and dividing single tubes into a plurality of tubes are sometimes incorporated.

Figure 2:
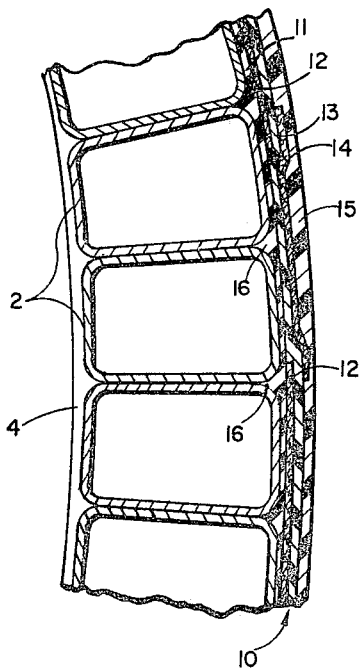
FIG. 2 is a cross section taken along line 2—2 of FIG. 1 and illustrating the thrust chamber wall construction.

About tubes 2 of the basic tubular assembly is a shell 10 (illustrated as an enlarged section in FIG. 2). Shell 10 is constructed of a coat of bonding material 11 properly cured, a series of cloth strips 12 stretched longitudinally over the assembly and over bonding material 11, a layer of filament 13 (alternatively called roving) wound over and binding strips 12 against the surface of material 11, a series of cloth strips 14 overlapping adjacent edges or spaces between strips 12, and an outer layer of filament 15 would over and binding strips 14 against the surface of filament layer 13. All filament and strip materials are thoroughly impregnated with a thermosetting resin either before or during their installation, the resin being subsequently cured to form the ultimate shell with the cloth strips and filament. The preferred materials to facilitate this construction are explained more fully below.

Shell 10 may be most expeditiously applied by first mounting the tubular assembly in a machine for rotation about its major axis. When the assembly is so installed, a flexible bonding material 11 is spread over the exterior surface of tubes 2 (FIG. 2) to completely cover interstices or indentations 16 formed between adjacent tubes 2 and to provide a smooth layer of bonding material 11 over the entire exterior of the tubular assembly. The purpose of bonding material 11 is to provide a seal coat about and/or between tubes 2 which will prevent the flow of pressurized gases in combustion chamber 9 from passing between tubes 2. Bonding material 11 also provides a surface to which later added fiber materials and resins will readily adhere. It has been found, for example, that epoxy resins, polyamides, polysulfide rubbers, various other rubber compositions, mixtures of two or more of these items, or, in some cases, various metals are effective for use in this repsect. The epoxy resins useful as bonding materials are composed of epoxy resins, or glycidyl polyether resins as they are sometimes called. They are obtained by reacting a dihydroxy hydrocarbon with an epihalohydrin, which is a halogenated epoxy hydrocarbon compound, in the presence of either a base or an acid. For example, the reaction of a mol of 2,2-bis(4-hydroxyphenyl)propane with 1 or more mols of epichlorohydrin in the presence of a base such as sodium hydroxide produces a glycidyl polyether resin having terminal epoxy groups. Similarly, 1 mol of diethylene glycol can be reacted with one or more mols of 1,2-epoxy-3-chlorohexane in the presence of an acid catalyst such as borontrifluoride or its derivatives to produce a polyether compound having epoxy groups at each end of the molecules. These glycidyl ether compositions and method for their preparation are described in various technical publications. Various patents also refer to methods for the preparation of glycidyl polyether compounds. Among them are the Castan Patents 2,324,483 and 2,444,333. The product that is obtained when epihalohydrin is one of the reactants may be represented by the formula

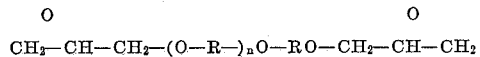

wherein R represents a divalent hydrocarbon group and $n$ is an integer of the series 0, 1, 2, 3, etc. In general, these glycidyl ethers have an epoxy equivalency greater than 1.0 and contain terminal 1,2-epoxy groups. By the epoxy equivalency is meant the number of 1,2-epoxy groups per average molecular weight of the glycidyl ether. Since the measured molecular weight of the mixture, upon which the epoxy equivalency is dependent, is the average molecular weight, the epoxy equivalency will not necessarily be 2.0 but will be between 1.0 and 2.0.

When the dihydric alcohols employed in the preparation of the glycidyl polyethers are saturated aliphatic alcohols in which each carbon atom is bonded by single bonds to four different other atoms or groups of atoms, they may have from 2 to about 20 carbon atoms and from 2 to about 11 oxygen atoms. These include dihydroxy saturated hydrocarbons such as 1,2-dihydroxyethane, 1,3-dihydroxypropane, 1,8-dihydroxyoctane, 1,2-dihydroxydodecane, dihydroxyeicosane, etc. Another class of dihydroxy compounds that can be used consists of polyether glycols such as diethylene glycol, dipropylene glycol, hexaethylene glycol, decaethylene glycol, etc. When preparing the glycidyl polyether compounds one or a mixture of two or more alcohols can be employed. Dihydric aromatic compounds having from 1 to 2 aromatic nuclei in the molecule may also be used. Examples of these are: Catechol, hydroquinone, ethyl resorcinol, 2,2-bis(4-hydroxyphenyl)propane, 2,2-bis(4-hydroxyphenyl)methane, 2,2-bis(4-hydroxyphenyl)butane, 1,5-dihydroxynaphthalene, etc. The epoxy resins employed have epoxide equivalents of from about 140 to about 2000. Resins are applied with the aid of heat when necessary to maintain a liquid state.

An example of a specific formulation A found useful is one having substantially 53% by weight of an epoxy resin obtained by the reaction of 2,2-bis(4-hydroxyphenyl)propane with epichlorohydrin in the presence of sodium hydroxide as a catalyst and having an epoxide equivalent of from about 190 to about 210, 31% of a long chain aliphatic polysulfide polymer containing disulfide links and reactive terminal groups, i.e. a material having an average structure as follows:

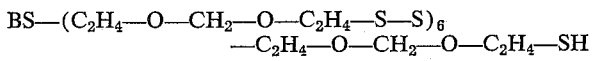

(e.g. Thiokol Corp. LP–3), 9% of a powdered free silica thickener, and 7% of an amine salt of 2-ethyl hexoic acid and zinc oxide curing agent. These constituents are preferably mixed in the order listed until a smooth, high viscosity mixture is achieved. The resulting material is then applied to the tube surface, preferably in the same direction as the tubes extend to minimize air entrapment in the tube interstices. The external tube surface between the interstitial areas are also covered with a seal coat layer which is usually no more than ten mils (thousandths of an inch) thick, providing a complete and integral seal coat covering over the entire external periphery of the chamber. Another resin employed in preparing the compositions of the bonding materials of this invention is a polyamide which is obtained by heating at a temperature sufficiently high to bring about amide formation a dicarboxylic aliphatic acid containing from about 4 to about 36 carbon atoms with an aliphatic amine having from 2 to about 5 nitrogen atoms and from 2 to about 12 carbon atoms, and wherein at least two of said nitrogen atoms are primary amino nitrogen, in the molar ratio of from about 1:2 to about 3:2 amino-to-acid. An example of a polyamide is the diethylenetriamine amide of dilinoleic acid.

Other polysulfide rubbers and other rubber compositions such as neoprene and butadiene rubbers and their mixtures may also be used. The rubbers are well known in the art, a description of which may be found in "Synthetic Rubber," by Whitby, John Wiley & Sons, Inc., New York.

This seal coat is then cured. The curing may be accomplished by placing the coated chamber in an air-circulating oven wherein the seal coat is subjected to a temperature sufficient to bring the material to a firm, rubbery texture which adheres firmly to the base metal. A temperature of 200° F. (—10° F.) maintained for approximately one hour has been found adequate for the formulation set forth above and containing an epoxy resin and LP–3 constituents. Curing times and temperatures may vary from chamber to chamber dependent upon chamber size, coating thickness, coating composition, or other variables.

An alternative procedure to the application of bonding material 11 is to fill the interstices with braze material by conventionally known hand or furnace brazing techniques. A coat of bonding material may be applied over the brazed tubes, if desired. While this procedure adds weight to the ultimate chamber and lowers the production rate to some extent, it provides a configuration having high resistance to tube separation.

Figure 5:
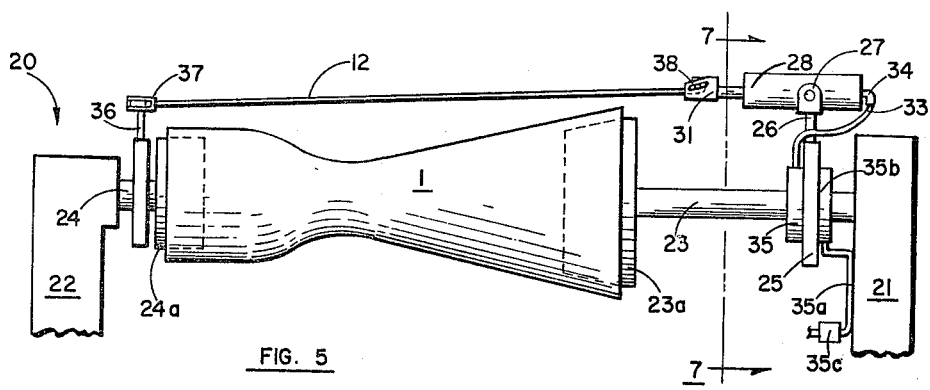
FIG. 5 illustrates a thrust chamber installed in a machine preparatory to filament winding.

The sealed assembly is then placed upon a machine of the nature shown in FIG. 5 and a series of glass cloth strips 12 and 14 are placed longitudinally of the chamber. The purpose of these strips in the final configuration is twofold: (1) To provide integral longitudinal strength members for structural integrity of the completed plastic shell to prevent shell splitting resultant from circumferential cracking tendencies, and (2) to provide a means for retaining subsequently wrapped filament in its wrapped position upon sloped surfaces.

Figure 3:
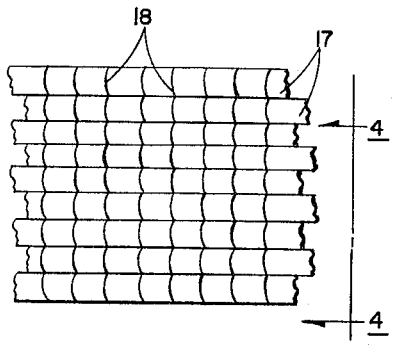
FIG. 3 is an enlarged plan view of a portion of a glass cloth strip usable in this fabrication method.
Figure 4:
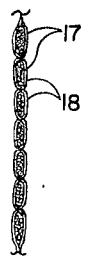
FIG. 4 is an end view of the glass cloth taken along line 4—4 of FIG. 3.

Glass cloth strips 12 and 14 are usually identical in structure and uniform in width between their ends. A portion of a representative strip is shown in FIG. 3 and a magnified end view of a strip portion is illustrated in FIG. 4. The illustrated strip is generally comprised of a plurality of strands 17 of fiberglass filament positioned parallel one another to form a flat band or cloth. Each of strands 17 may include from about 8 to about 150 filaments, dependent upon the particular application. The strands may be spaced from one another, but best results are obtained when they are maintained in close proximity so as to avoid spaces wherein pockets of resin can form. The fabric can be made from any of the roving materials listed below and woven, braided, bonded with resin adhesive, or brazed when wire filament is used. Strands 17 are usually sewn together with a series of thread 18.

The number of cloth strips required for the first layer of an individual thrust chamber depends upon chamber size and shape, and strip thickness. The width of the strips will depend on the diameter of the chamber being wrapped, wider strips being used on large chambers. Usually, the strips extend longitudinally of the thrust chamber. Strip spacing is dependent upon chamber size. It is generally desirable that strip edges on each layer be abutted at the chamber injector end, overlap of the strips beginning thereafter and becoming increasingly greater as the throat is approached. As the chamber diameter again increases, spaces may develop between the strips, the width of the end space being a function of maximum chamber diameter. The second or any subsequent layers of strips are laid over prior layers so that the edges of the prior layer are intermediate the edges of the next subsequent layer. The first layer of strips 12 is securely bound to the chamber surface by circumferentially wrapping filament therearound. The second overlapping layer of strips 14 is then similarly positioned and wrapped with filament. When this layer is completed, at least one complete glass strip covering of the thrust chamber surface is provided.

Threads or stitching 18, or the otherwise obtained uneven surface, are maintained in a position essentially normal to strands 17 and protrude above the surface of the filaments to form a rough surface texture. This assists in solving one of the critical problems in the practice of this invention, i.e., preventing the circumferentially wound roving from slipping down the slopes of the chamber. Were such slippage to occur, a complete failure of the particular wrapping operation could result. The action of threads 18 in preventing the slippage is to supply friction means or a mechanical gripping surface against which the roving can secure a footing to maintain its position upon the slope. While many techniques have been studied in an attempt to overcome the slippage problem, the best results have been accomplished through the utilization of the fiberglass strips, constructed as described, together with the controlling of the tension applied to both the glass cloth strips and the winding filament during the winding phase of the invention.

Figure 6:
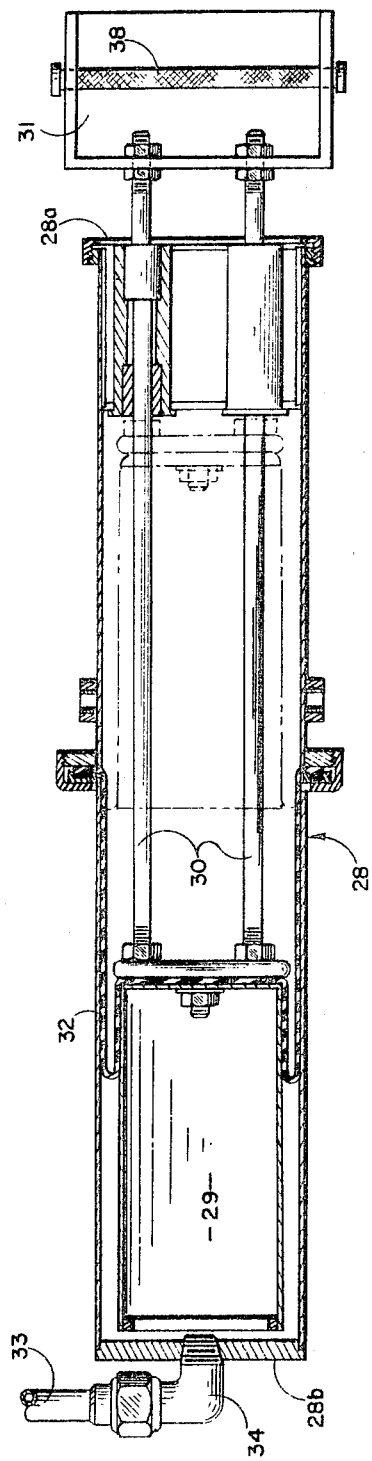
FIG. 6 is a cross section of a vacuum cylinder assembly utilized to maintain strip tension.
Figure 7:
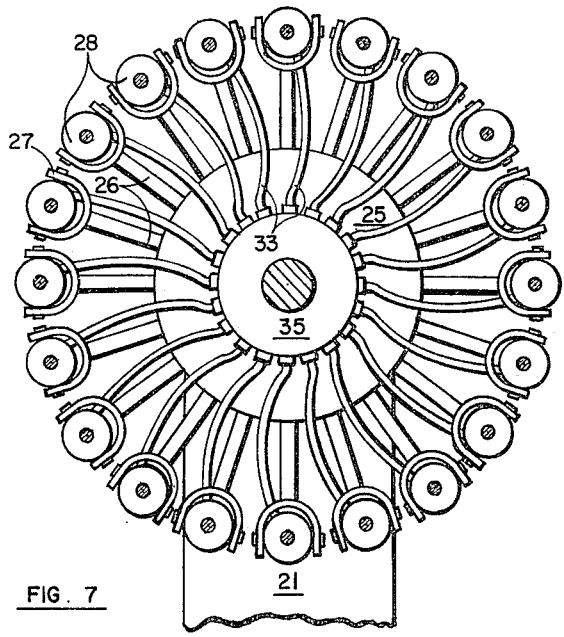
FIG. 7 is a view of the wrapping machine taken along line 7—7 of FIG. 5.

FIGS. 5, 6, and 7 illustrate a representative apparatus which has been successfully utilized in maintaining proper positioning and tensioning of cloth strips while filament is being applied. A filament-wrapping machine, generally indicated as 20, is illustrated in FIG. 5 only to the degree necessary to explain the preferred method of practicing the invention. It includes a pair of supports 21 and 22, a bearing-mounted, rotatable shaft 23 extending from support 21 and a similar shaft 24 extending from support 22 in axial alignment with shaft 23. Shafts 23 and 24 are adapted to contact mating plugs 23a and 24a installed in either end of thrust chamber 1 and so aligned with thrust chamber 1 that rotation of shafts 23 and 24 will cause chamber 1 to accurately rotate about its axis. Mounted upon and adapted to rotate with shaft 23 is a carriage 25. Extending from carriage 25 are a series of spokes 26. For purposes of clarity, only one spoke 26 and its attaching structure is shown in FIG. 5. A typical configuration is enlarged and more completely illustrated in FIG. 7. Each spoke 26 has a yoke 27 attached to its outer extremities. A cylinder 28 is mounted within each yoke 27 and adapted to pivot in a radial plane through the axis of thrust chamber 1.

Interiorly of each cylinder 28 (FIG. 6) a vacuum-actuated piston 29 is mounted upon and adapted to be moved axially by a shaft or, preferably, a pair of shafts 30. Shafts 30 extend through end 28a of cylinder 28 and are connected together externally of the cylinder by a strip holder 31. A rolling type diaphragm 32 is connected between piston 29 and the internal wall of cylinder 28, as a seal capable of progressively doubling upon itself to allow piston reciprocation while maintaining a seal.

A flexible hose 33 is attached between an elbow 34 in sealed end 28b and a vacuum manifold 35 (FIGS. 5 and 6) in which a partial vacuum is maintained by conventional pumping means acting through line 35a and a stationary conventional sealed ring 35b. This vacuum circuit also includes an adjustable venting orifice 35c which allows air to enter the system as piston 29 is retracted in order that the vacuum will not be increased. When so connected to manifold 35, each cylinder 28 is assured of having a vacuum pressure applied to the area within which piston 29 is sealed equal to the vacuum of each of the other cylinders. While the system is operational, the same amount of vacuum-actuated tension will therefore be applied to each strip holder 31 and ultimately to the cloth strips attached thereto.

Mounted upon shaft 24 is a second set of radially adjustable spokes 36 corresponding in number to and in operating alignment with spokes 26. A strip holder 37 is mounted upon the outer extremity of each radial spoke 36.

In the utilization of the described machine, a cloth strip is attached between each strip holder 31 and an aligned strip holder 37 across the surface of thrust chamber 1, each strip being under equal tension with every other strip. Strip fastening devices 38, forming a part of holders 31 and 37, may be of any conventional construction. However, they must be capable of holding each strand 17 of the strip in its initially installed position without slippage. This prevents the movement of threads 18 (FIG. 3), loss of proper tension, and ultimate slippage of circumferentially wrapped filaments.

After the cloth strips have been installed in the wrapping machine about the periphery of chamber 1, the machine is driven in rotary motion by a conventional power means (not shown). The thrust chamber, together with shafts 23 and 24, spokes 26 and 36, the machine components attached to the radial spokes, and the cloth strips are rotated as one unit. As the chamber is rotated, a properly selected filament, one end of which has been previously attached to one end of the chamber, is fed through and impregnated by a resin (defined below) and is progressively wound circumferentially about the chamber periphery from one end of the chamber to the other, pulling the strips 12 radially inwardly toward the chamber surface and binding them tightly to that surface. Prior to actual wrapping, a coat of resin may be spread evenly upon the exterior of the seal coat or directly upon the exterior of the brazed tubes if the seal coat is not used. This assists in assuring a complete bond between the later applied roving and strips and the chamber surface. Use of a resin preimpregnated filament may eliminate the necessity for the above impregnation step. In such case, the preimpregnated filament may be passed through a heating unit prior to wrapping to increase its tackiness.

Figure 8:
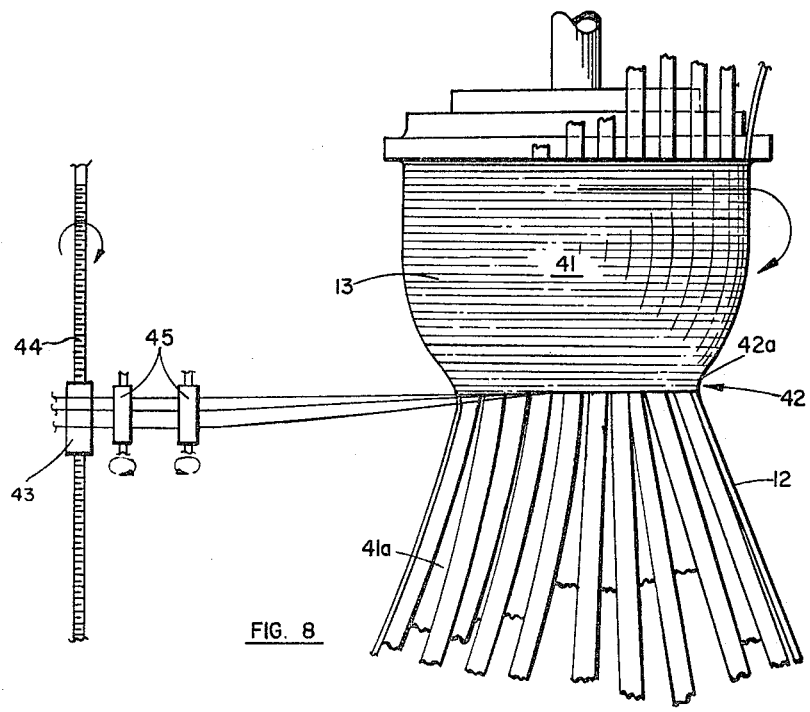
FIG. 8 is a partially cut-away view illustrating a thrust chamber in the process of wrapping.

FIG. 8 further illustrates a thrust chamber in the process of being wound with filament. The wrapping has therein progressed over the combustion chamber 41 and down the slope to the thrust chamber throat 42. At this point in the wrapping procedure it will be noted that the slope being wrapped is somewhat severe, the actual slope being determined in each instance by the design characteristics of the individaul thrust chamber. The ability to prevent slippage of roving while wrapping such slopes is one of the advantages of the present process. As heretofore explained, one of the characteristics of the process which gives this ability is the thread arrangement in the glass cloth strip construction. A second characteristic is the controlling of the tension on such strips during actual slope winding through the utilization of the apparatus described above. It will be further noted that the cloth strips of FIG. 5 are stretched under tension (13 to 20 pounds, preferably about 16 pounds, continuously maintained on a 4-inch wide strip) between strip holders 31 and 37, and that the roving in FIG. 8 has been wound over one end of the cloth strips binding them tightly to the tubes. At this point, the portions of strips 12 not covered are still under the same tension as originally applied. Hence, at point 42a of FIG. 8, the roving is actually being wrapped down a slope through the application of the roving to the lower extremity of a valley, the position of the tensioned fiberglass strips and the direction of threads 18 normal to the strip filaments cooperating in preventing the roving, also under tension, from slipping down the slope as it makes contact with the surface upon which it is wound. It is necessary that the position from which the roving is being fed onto the chamber surface be maintained approximately normal to the chamber axis. Therefore, machine 20 includes means for progressively moving a roving guide along the chamber length at a predetermined, variable speed as the wrapping proceeds. For example, in FIG. 8 a nonrotatable roving guide 43 is moved by the rotation of screw 44 to which it is adapted. Proper guide movement results in each strand of roving being laid flat upon the chamber in abutting contact with the prior strand. It also results in a final product with maximum structural integrity due to maximum filament density.

It is preferred that wrapping be accomplished down, rather than up, the slope in order that the advantages of the above procedure might be exploited. Therefore, prior to the wrapping of nozzle portion 41a of the FIG. 8 chamber, strips 12 and the filament are severed. New strips 12 are then stretched as originally described and the filament is wrapped over them in the manner described above, but beginning at the opposite end of the chamber. The filament is wrapped down the nozzle slope toward throat 42 to meet or overlap the initially wrapped portion. It is usually desirable for longitudinal strength purposes and for building up the wrapping materials in the throat area to facilitate the attachment of other parts, that the ends of the glass cloth strip in his region be overlapped.

Afer one complete layer of cloth strips has been wrapped with roving, the roving ends and the strip ends are severed, and another set of glass cloth strips is positioned in the machine so as to cover any splits or gaps between the first set. The wrapping sequence is then repeated and the free ends are severed. This procedure may be repeated any desired number of times, dependent upon shell thickness and strength requirements. The wrapped chamber is next removed from the winding machine and the impregnating resin is cured as set forth hereinafter.

Since one of the major items in the practice of the present invention is the filament or roving used in winding, its selection is important. It is preferable that filament wrapped upon its spool so as to feed from the spool exterior (outside pullout) rather than from the spool interior (inside pullout) be used so as to prevent filament twisting. Proper tension on the filaments is of importance in the practice of the invention, as are also good strand structural integrity, and a finish that may be easily impregnated with an impregnating resin. While roving having from one to about sixty strands may be satisfactorily used, it has been found that 20-end (20 strands) is most generally satisfactory. It is also desirable that a roving having the ability to retain strength under high humidity conditions be used.

Various organic and inorganic materials are usable as the filaments of this invention. Various inorganic materials such as glass or quartz fibers, or poly crystalline fibers such as beryllium oxide whiskers, silica fibers, and alumina fibers are used. The poly crystalline fibers are also referred to as ceramic fibers. Metallic fibers, metallic coated fibers, e.g., high melting point material (e.g., quartz) coated with aluminum, or combinations of two or more of these materials are also used. Where metallic coated fibers are used, the metals may be fused at high temperatures to facilitate bonding. Organic filaments (e.g., drawn filaments) are useful for some applications wherein the high strength characteristics of the inorganic materials are not required. An example of such a filament is nylon. Other organic materials will be apparent to those skilled in the art.

Filaments having diameters of from about 0.03 to about 30 mils with a preferred range of from .03 to about 1 mil are acceptable for present purposes. When glass fibers are used, good results are obtainable using filament diameters of .04 mil. The filaments can be continuous, such as extruded filaments of the organic type or discontinuous, such as the twisted type, utilized in many inorganics. The strands can be used singly or several strands can be bundled or twisted. An example of one glass fiber filament which has been found highly satisfactory for the present use is a commercial product known as 801 size— 140 1/0, 20-end uniform tension outside pullout.

The fact the humidity affects certain of the listed rovings is a factor of importance in practicing the invention. The strength characteristics of the final product under high humidity conditions are reduced, even if a so-called humidity-resistant roving is utilized. Best results are therefore obtained when some materials by heating the roving spools in an oven under controlled temperature conditions immediately prior to the wrapping operation, thus eliminating absorption of excess moisture. A temperature on the order of 250° F. is ordinarily sufficient for this purpose.

Several bundles of roving may be wrapped simultaneously in order that the speed of wrapping might be accelebrated and in order that the roving impregnation might be most efficiently achieved. About six bundles of 20-end roving have been found to wrap slopes in a desirable manner. On noncritical slopes considerably more than six strands can be used.

Resins used in impregnating the filaments can be prepared from any material usable as seal coat material. Additionally, alkyd resins can be used. The alkyd resins are derived from polyhydric alcohols and polybasic acids. Non-limiting examples include resins obtained by the copolymerization of phthalic acid and glycerol, phthalic acid and diethylene glycol, etc.

The resins can include hardners generally known in the art. For example, m-phenylenediamine is a hardener for epoxy resins. Polyamides are also good hardening agents, as are amines in general. Examples of the latter are butyl amine, heptylamine and the polyamines such as ethylenediamine, diethylenetriamine, triethylenetetramine, and tetraethylenepentamine. An epoxytype resin and hardener prepared in accordance with Federal Specification L–P 406, and wherein the hardener is a eutectic mixture of methylene dianiline (MDA) and meta phenylene diamine (MPDA), has been found to be especially desirable for use with glass filaments. About 80 parts by weight of resin are usually catalized with approximately 20 parts by weight of hardener, the constituent being thoroughly mixed prior to application to the roving in formulations of this type.

Best strength characteristics are achieved when the minimum amount of resin necesssary to assure filament bonding is ultimately retained upon the filaments. Therefore, it is desirable to wipe excess resin from the roving strands immediately prior to wrapping. This is accomplished by wipers 45, schematically illustrated in FIG. 5. Wipers 45 may be in the form of a fiberglass cloth wrapped about one or a series of bars or rollers and movable with the roving guide. The ability of the wiper to remove excess resin may also be enhanced by applying tension to the roving. Excess resin adheres to the cloth as the filament passes over it.

After the resin-impregnated filament wrapping steps have been completed, it is necessary that the resin be cured in order to integrate the cloth strips, filament, and resin into a single hard shell having the described characteristics. The curing is accomplished by subjecting the overall wrapped thrust chamber to a temperature of from about 50° F. to about 800° F. The typical range for an expoy resin is from about 60° F. to about 500° F., and preferably about 275° F. for about two hours.

High energy radiation can also be applied to accomplish curing. For example, X-rays, α rays, neutrons, protons, electrons, etc., or β rays are usable.

When metal coated fibers are used as a filament, the filament must be subjected to a temperature sufficient to fuse the particular metals in what is essentially a brazing technique.

Hat bands 46 for structrual rigidity and pads 47 for gimbal actuator attachment, as shown in FIG. 1, or other structrual members for stiffening or attachment purposes, may be adhered to any portion of the chamber surface. These members may be attached by wrapping attachment legs thereof directly to the chamber surface with filament layers prior to curing the initial shell. Otherwise the attachment may be made by sand blasting the cured shell surface in the areas to which the components are to be attached, applying a layer of adhesive of essentially the consistency of the flexible bonding material 11, placing the member upon the coated surface and winding a layer of fiberglass roving upon each leg of the component, using the same circumferential winding techniques described above except that glass cloth strips need not be used. The thickness of the layer of roving sufficient for this purpose is determined in each case as a function of the size of the chamber and the component being attached, and of the magnitude of load to be applied. It is also sometimes desirable to make attachments by a lay-up of glass fiber cloth laid over the attachment legs and cured to the chamber surface using bonding materials and curing techniques essentially as set forth herein.

In some instances it is desirable that only a portion of the thrust chamber, e.g. the nozzle, have the glass reinforced-plastic shell installed. In such cases, the above process steps are carried out essentially as set forth, except that the materials are applied only over the desired chamber length.

As mentioned above, the plastic shell of this invention is also adaptable to solid propellant rockets through the application of the shell or casing directly over a solid propellant grain. The grain in such case is used as a mandrel about which the reinforced plastic shell is wrapped. A representative illustration (somewhat schematic) of a rocket so constructed appears in FIGS 9 and 10.

In practicing the invention in this manner, a solid propellant grain 50 is prepared by conventional techniques. When the grain is to be center-burning and therefore contains a central cavity, such as 51, best results are achieved by filling this cavity prior to the wrapping with a suitable mandrel 52 made, for example, of wax or wood. The cavity-filling material 52 is melted away or otherwise removed after the wrapping is completed. This minimizes the possibility of grain breakage during casing fabrication. End pieces 53 and 54 are placed over the grain ends for structural support. When desired, end piece 53 may include nozzle portion 55 integrally or otherwise conventionally attached thereto. Flanges 56 and 57 form portions of end pieces 53 and 54 respectively for casing attachment. These flanges may be flared outward to provide a mechanical resistance to separation after the shell is installed. Current resin-to-metal bonding techniques in commercial practice, however, are sufficiently advanced to facilitate a nonseparable bond for application wherein size and pressures are within certain levels even without the flare.

After the end pieces are in place it is usually desirable to place an insulating material 58, e.g. an asbestos-filled rubber material comprised of about 20 parts neoprene rubber, 80 parts butyl rubber, and 200 parts asbestos, against the grain to protect the casing from excessive heats during combustion. For some applications a liner (not shown) typically made from a polyurethane rubber can also be utilized around the insulation.

Figure 9:
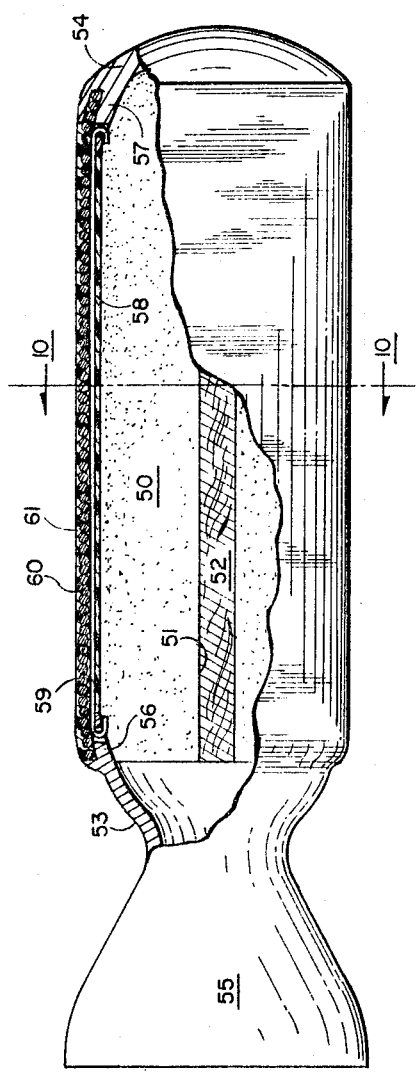
FIG. 9 is a partial cut-away of a solid propellant rocket engine having a casing applied in accordance with the present invention.
Figure 10:
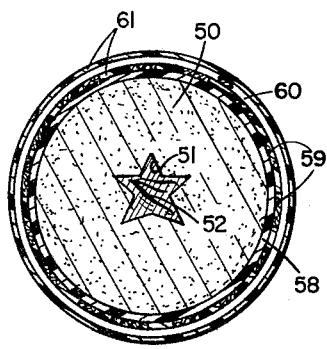
FIG. 10 is a view taken along line 10—10 of FIG. 9.

In order that the shell might have longitudinal structural integrity, means which will prevent circumferential shell separation are provided. This is accomplished by wrapping filament helically about grain 50 and over flanges 56 and 57, and insulation 58. Alternatively, and as illustrated in FIGS. 9 and 10, glass cloth strips 59 or similar reinforcing means may be placed longitudinally of the grain over and/or attached to flanges 56 and 57. Filaments 60 are then wrapped circumferentially and the resin impregnated assembly is cured in substantially the manner described above. Multiple layers of strips 59 and filament 60, impregnated with resin 61, may be applied when desirable. The resin is then cured in substantially the same manner set forth above. Dependent upon the propellant grain used, appropriate care should be exercised in curing to prevent propellant combustion due to overheating. When the resin curing has been completed, cavity-filling material 52 is removed.

Using the grain as a winding mandrel as described results in a compressive stress being introduced into the grain. Prestressing of the grain can be accomplished by winding with tensioned filament at room temperature, the force from the winding introducing the prestress into the grain and the insulating laminate. Subsequent resin curing will only partially relieve the stress, the remainder maintaining the desirable, ultimately stressed grain condition.

Greater stress than otherwise possible is introduced by refrigerating the grain prior to wrapping. Subsequent grain expansion, when raised to ambient temperatures, will result in the stress buildup. The temperature range and filament tension used is variable as desired, dependent upon propellant composition and ultimate stress requirements.

This prestressed structure is desirable since upon firing of the propellant, the stress is counter-balanced by internal forces, minimizing possibilities of structural grain damage. The danger of the grain breaking loose from the casing due to temperature variations is minimized. Since the coefficient of thermal expansion of the grain is greater than that of the casing, the grain is prestressed at storage temperaure. The storage temperature should therefore be held within reasonably narrow limits.

It is also to be understood that the described process for producing a hard shell is sometimes also applied to thrust chambers having channelled or otherwise formed regeneratively cooling passages, or to uncooled chambers. The shell is, for example, built up to a desired thickness around a mandrel either with or without a liner and/or insulation of suitable material. The mandrel is then removed and the shell proper, together with or separate from the liner and insulation, is used as a short duration uncooled thrust chamber.

The following examples will more fully illustrate the process of this invention.

*Example I*

A plurality of elongated tubes of varying cross section were assembled into a desirably shaped circumferential pattern and secured by a plurality of circumferential metal bands as described hereinabove and as shown in the drawings. A bonding material was then applied to the interstices formed between the tubes, providing a seal against the passage of combustion gases. The bonding material was composed of an epoxy resin obtained by the reaction of epichlorohydrin and 2,2-bis(4-hydroxyphenyl)propane as described above, having an epoxide equivalent of from about 190 to about 210. A series of cloth strips, spaced from one another, were stretched longitudinally over the sealed tube surface. The strips were fabricated from bundles of glass fiber filaments stitched together by nylon threads protruding above the filament bundle surfaces were next thoroughly impregnated with a composition of epoxy resin prepared in accordance with Federal Specification L–P 406, and hardener. The hardener was a eutectic mixture of methylene dianiline and meta phenylene diamine present in an amount of 19 parts per 100 parts of resin. The resin consisted of the above described epoxy resin obtained by mixing 30 parts of a resin having an epoxide equivalent of 170–180 with 70 parts of an epoxide resin having an epoxide equivalent of 180–200. Continuous glass fiber filaments were then placed under tension, passed through the last mentioned impregnating resin and wrapped tightly around the glass cloth strips so as to bind those strips to the bonded tube surfaces over the approximate length of the assembled tubes. A second series of glass cloth strips, identical with the first series, was impregnated with the resin, stretched longitudinally of the wrapped tubes overlappingly positioned with respect to the first series of strips, and wrapped with resin impregnated glass fiber filament in the same manner as were the first strips. The assembled and wrapped tubes were placed in an oven and subjected to a temperature of approximately 200° F. for about two hours and until the resin was thoroughly cured. The cured assembly was then removed from the oven and cooled preparatory to subsequent installation of related rocket engine components.

*Example II*

The procedure of Example I is followed with the modification that composition A, described above, was employed as the tube bonding material and steel fibers of about 0.03 mil diameter substituted for glass fibers in the wrapping filament and in the cloth strips. The impregnating resin used in this case is one obtained by the copolymerization of equimolar quantities of phthalic acid and glycerol with substantially 10 weight percent m-phenylenediamine added as a hardener.

*Example III*

The procedure of Example I is repeated with the utilization of quartz fibers of 30 mils diameter coated with aluminum as both winding filament and the filament from which the cloth strips are fabricated. The use of resin as set forth in Example I is eliminated herein and incorporation of the cloth strips and filaments into a single unit is accomplished by subjecting the wrapped tube assembly to a temperature sufficient to fuse the filament metal coatings.

*Example IV*

A solid propellant grain is cast into an essentially cylindrical shape, and a flanged cap, one end of which includes a nozzle portion, is adapted over each end of the grain. A bundle of continuous nylon filament is impregnated with the alkyd resin and polyamide hardener composition of Example II and wrapped in a continuous helical pattern over the propellant grain and cap flange surfaces. The assembly so achieved is then subjected to a temperature of approximately 200° F. for about three hours until the resin and filament are cured into an integrated unit and firmly bonded to the cap flanges.

Similar results are obtained by utilizing the resin and hardener composition and the filament of Example I.

A rocket case having greater heat resistant properties is also obtained by placing an asbestos-filled rubber comprised of about 20 parts neoprene rubber, 80 parts butyl rubber, and 200 parts asbestos over the grain surface prior to the filament wrapping step.

*Example V*

The procedure of Example IV, in either of its aspects, is followed with the additional step of subjecting the propellant grain in its cast condition to a temperature sufficiently low to cause a grain shrinkage prior to wrapping with resin impregnated filament.

*Example VI*

A plastic shell is prepared in accordance with the procedure of Example I with the exception that a removable mandrel is utilized in the place of the tube assembly. Upon completion of the resin curing step the mandrel is removed, leaving a plastic shell usable as an uncooled rocket engine thrust chamber.

An oblating erosion resistant liner, either with or without an insulating material upon its outer periphery, is sometimes positioned about the mandrel prior to the plastic shell application and incorporated as an integral portion of the thrust chamber by the wrapping procedure.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A hollow structural element in the form of a surface of revolution having curvature along at least a portion of the surface in an axial direction comprising:

a plurality of longitudinally extending reinforcing strips of substantially parallel glass filaments disposed over at least said axially curved portion, said filaments secured to each other by stitching normal thereto providing a rough surface texture, a layer of glass filament circumferentially wrapped around said strips and a cured resin intimately disposed between said filaments so as to provide with said filaments a shell substantially free of voids.

2. A hollow structural element in the form of a surface of revolution having curvature along at least a portion of the surface in an axial direction comprising:

a plurality of cloth reinforcing strips disposed about and extending longitudinally over at least said axially curved portion, each of said strips including a multiplicity of substantially parallel filaments bound together in an essentially flat pattern by threads substantially normal to said filaments providing rough surface texture thereto, a plurality of filaments circumferentially wrapped around said strips, and a resin intimately impregnating said filaments, said resin being cured.

References Cited by the Examiner

UNITED STATES PATENTS

| | | | |
|---|---|---|---|
| 1,343,368 | 6/1920 | Kinsely | 161—57 |
| 1,494,317 | 5/1924 | Peraccini | 161—91 |
| 2,448,114 | 8/1948 | Olson et al. | 156—189 |
| 2,479,828 | 8/1949 | Geckler | 60—35.6 |
| 2,507,778 | 5/1950 | Frey | 220—3 |
| 2,539,404 | 1/1951 | Crutchfield et al. | 60—35.6 |
| 2,592,463 | 4/1952 | Phillips. | |
| 2,705,497 | 4/1955 | Johnson et al. | 156—153 X |
| 2,744,043 | 5/1956 | Ramberg | 156—155 |
| 2,762,419 | 9/1956 | Prewitt | 156—189 |
| 2,848,133 | 8/1958 | Ramberg | 60—35.6 |
| 2,961,738 | 11/1960 | Thomas | 112—412 X |
| 3,017,746 | 1/1962 | Kiphart | 60—35.6 |
| 3,047,191 | 7/1962 | Young | 220—83 |
| 3,073,475 | 1/1963 | Fingerhut | 220—3 |
| 3,115,271 | 12/1963 | Anderson et al. | 60—35.6 |

EARL M. BERGERT, *Primary Examiner.*

CARLTON R. CROYLE, *Examiner.*

P. DIER, *Assistant Examiner.*